(12) United States Patent
Nakamura et al.

(10) Patent No.: US 9,766,614 B2
(45) Date of Patent: Sep. 19, 2017

(54) MOTOR CONTROLLING APPARATUS FOR SUPPRESSING VIBRATIONS

(71) Applicant: FANUC CORPORATION, Yamanashi (JP)

(72) Inventors: Tsutomu Nakamura, Yamanashi (JP); Satoshi Ikai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/996,515

(22) Filed: Jan. 15, 2016

(65) Prior Publication Data
US 2016/0209829 A1 Jul. 21, 2016

(30) Foreign Application Priority Data
Jan. 16, 2015 (JP) .................................. 2015-007219

(51) Int. Cl.
G05B 19/404 (2006.01)
G05B 19/19 (2006.01)

(52) U.S. Cl.
CPC .......... G05B 19/404 (2013.01); G05B 19/19 (2013.01); *G05B 2219/41145* (2013.01); *G05B 2219/41251* (2013.01); *G05B 2219/41427* (2013.01)

(58) Field of Classification Search
CPC .................................................. G05B 19/404
See application file for complete search history.

(56) References Cited

U.S. PATENT DOCUMENTS 4,139,811 A * 2/1979 Klinger ................ G05D 3/1445
318/611
4,914,365 A * 4/1990 Murakami ............. B25J 9/1633
318/561

(Continued)

FOREIGN PATENT DOCUMENTS

CN 101795880 A 8/2010
CN 102570956 A 7/2012

(Continued)

OTHER PUBLICATIONS

Machine translation JP2009255805A.*

(Continued)

*Primary Examiner* — Kawing Chan
(74) *Attorney, Agent, or Firm* — Fredrikson & Byron, P.A.

(57) ABSTRACT

A motor control apparatus of the present invention is a motor control apparatus for compensating elastic deformation between a servo motor and a driven part, driven by the servo motor, which includes a position command generator for generating a position command of the motor, a compensation filter for compensating the position command generated by the position command generator and a servo control unit for controlling the movement of the motor based on a position command after compensation, i.e., the compensated position command by the compensation filter, and is constructed such that the compensation filter includes a filter $F(s)$ having an inertia $J_L$ of the driven part, a stiffness coefficient K of an elastically deformable part and a damping coefficient C of the elastically deformable part as the elements of filter coefficients.

1 Claim, 5 Drawing Sheets

(56) References Cited

U.S. PATENT DOCUMENTS

| | | | | |
|---|---|---|---|---|
| 5,030,901 A * | 7/1991 | Futami | G05B 19/237 | 318/594 |
| 5,093,609 A * | 3/1992 | Sakamoto | H02P 23/16 | 318/561 |
| 5,220,262 A * | 6/1993 | Kneifel, II | G05B 19/19 | 318/569 |
| 5,691,615 A * | 11/1997 | Kato | B25J 9/163 | 318/432 |
| 6,218,801 B1 * | 4/2001 | Brog.ang.rdh | B25J 9/1674 | 318/565 |
| 8,040,098 B2 * | 10/2011 | Zhang | G05B 11/42 | 318/560 |
| 8,855,826 B2 * | 10/2014 | Benosman | G05D 19/02 | 188/378 |
| 8,860,352 B2 * | 10/2014 | Benosman | G05B 5/01 | 318/250 |
| 9,257,932 B2 * | 2/2016 | Ikai | H02P 25/02 | |
| 2003/0020427 A1 * | 1/2003 | Hamamura | G05B 13/042 | 318/632 |
| 2005/0080495 A1 * | 4/2005 | Tessier | B64C 13/04 | 700/63 |
| 2006/0208683 A1 * | 9/2006 | Ide | H02P 6/00 | 318/609 |
| 2010/0052597 A1 * | 3/2010 | Dong | H02N 1/008 | 318/662 |
| 2011/0193510 A1 * | 8/2011 | Fleming | B82Y 35/00 | 318/611 |
| 2011/0288791 A1 * | 11/2011 | Jeppesen | G01N 3/38 | 702/42 |
| 2013/0234642 A1 * | 9/2013 | Igarashi | B25J 9/1641 | 318/611 |
| 2015/0115860 A1 * | 4/2015 | Wang | G05B 13/024 | 318/561 |
| 2015/0295522 A1 * | 10/2015 | Sakai | G05B 19/404 | 318/631 |
| 2015/0303855 A1 * | 10/2015 | Verhulst | H02P 23/04 | 62/611 |
| 2015/0361658 A1 * | 12/2015 | Yamashina | F16F 7/1005 | 52/1 |

FOREIGN PATENT DOCUMENTS

| | | | | |
|---|---|---|---|---|
| JP | 2000148250 A | * | 5/2000 | |
| JP | 2004272749 A | * | 9/2004 | |
| JP | 2004272883 A | | 9/2004 | |
| JP | 2005174082 A | * | 6/2005 | |
| JP | 200970396 A | | 4/2009 | |
| JP | 2009226520 A | * | 10/2009 | |
| JP | 2009255805 A | * | 11/2009 | |
| JP | 2010088290 A | | 4/2010 | |

OTHER PUBLICATIONS

Machine translation JP2005174082A.*
English Abstract and Machine Translation for Japanese Publication No. 2009-070396 A, published Apr. 2, 2014, 21 pgs.
English Abstract for Japanese Publication No. 2004-272883 A, published Sep. 30, 2004, 1 pg.
English Abstract and Machine Translation for Japanese Publication No. 2010088290 A, published Apr. 15, 2010, 19 pgs.
English Abstract for Chinese Publication No. 102570956 A, published Jul. 11, 2012, 1 pg.
English Abstract and Machine Translation for Chinese Publication No. 101795880 A, published Aug. 4, 2010, 29 pgs.

* cited by examiner

MOTOR CONTROLLING APPARATUS FOR SUPPRESSING VIBRATIONS

BACKGROUND OF THE INVENTION

1. Field of the Invention

The present invention relates to a motor controlling apparatus, and in particular to a motor controlling apparatus for suppressing vibrations by compensating a commanded position by multiplying a commanded acceleration with a gain determined from constants of the mechanical system.

2. Description of the Related Art

Conventionally, in motor control apparatuses for driving a machine with a motor, a servo control system includes a low-pass filter or notch filters to deal with high-frequency mechanical resonance. These filters are deployed in the control loop of the servo control system, and provided not for compensating position commands but aiming at improvement of the response and stability of the servo control system.

On the other hand, in order to deal with low-frequency resonance, techniques for using smooth commands, techniques of processing commands with notch filters, techniques using an input shaping method for commands and others have been used. These are, differing from countermeasure against high-frequency resonance, designed to cut off or sufficiently reduce the energy of resonance frequencies of the mechanical system, from the position command given to the servo control system.

Further, there is a method of controlling an inertial system by setting up an operation amount for vibration suppressing control by multiplying acceleration command information by a predetermined gain and adding the operation amount for vibration suppressing control to the position command (e.g., Japanese Laid-open Patent Publication No. 2010-88290 A).

In the motor control apparatus in machine tools, generally, PTP (Point to Point) control without regards to a moving path, or path control that controls the machine position along a given moving path, is carried out. When a motor control apparatus performs path control, it is unpreferable that the servo control system greatly deviates from the commanded path programmed by the user.

A case in which time-sequential position commands are given to a certain servo control axis will be taken into consideration. The purpose of the servo control system is to drive a machine in accordance with the time-sequential position commands. However, mechanical resonance sometimes prevents the servo control system from driving a machine exactly on the commanded position. The vibration remains as residual vibration after the axis is stopped, causing problems such as forming a stripe pattern on the workpiece being machined if the machine tool is in machining operation.

When conventional techniques such as notch filters, input shaping and the like are used, the energy components corresponding to resonance frequency are cut by notch filters or input shaping, so that residual vibration is reduced. However, since these filters change the commanded path in compensation for reduction of the residual vibration, there occurs a phenomenon that the machine cannot be driven following the commanded path the user has programmed. For example, when the commands are processed through notch filters, generally overshoot occurs. It is easily understood there from that step response of notch filters causes overshoot. If use of notch filters causes an overshoot in the commanded path, traces corresponding to the overshoot are left on the workpiece, hence degrading machining quality.

SUMMARY OF THE INVENTION

Although the conventional notch filtering or input shaping implemented to the commands is excellent in suppressing residual vibration, there has been the problem that the machine tool moves along a path different from the commanded path the user has programmed.

A motor control apparatus according to one embodiment of the present invention is a motor control apparatus for controlling a servo motor, which includes a position command generator for generating the position command of the motor, a compensation filter for compensating the position command generated by the position command generator and a servo control unit for controlling the movement of the motor based on a position command after compensation, i.e., the compensated position command by the compensation filter, and is constructed such that the compensation filter includes a filter F(s) having an inertia $J_L$ of the driven part, a stiffness coefficient K of an elastically deformable part and a damping coefficient C of the elastically deformable part as the elements of filter coefficients.

BRIEF DESCRIPTION OF THE DRAWINGS

The object, features and advantages of the present invention will be better understood by reading the following description of the embodiments, taken together with the drawings wherein.

DESCRIPTION OF THE INVENTION

Referring now to the drawings, the motor control apparatuses according to the present invention will be described. However, it should be noted that the technical scope of the present invention is not limited by the embodied mode of these but embraces the inventions defined by the claims and their equivalence.

First Embodiment

Figure 1:
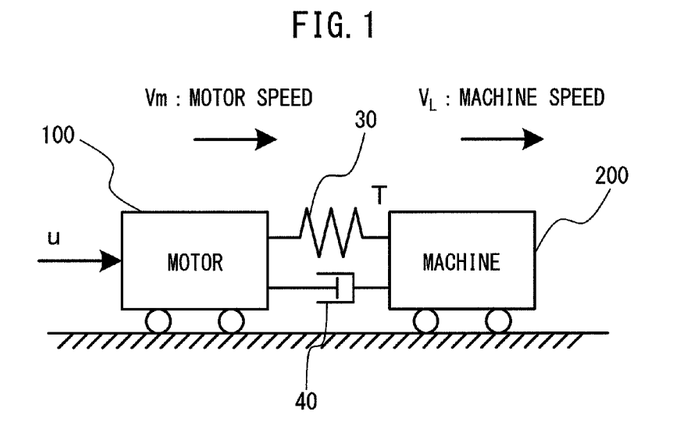
FIG. 1 is a model showing a two-inertia system handled in a motor control apparatus according to a first embodiment of the invention.

To begin with, a motor control apparatus according to the first embodiment of the present invention will be described. In the motor control apparatus according to the first embodiment of the invention, command compensation is performed on the premise that path control is performed for a two-inertia system representing the simplest vibration model. FIG. 1 shows a two-inertia system model handled by the motor control apparatus according to the first embodiment of the present invention.

In FIG. 1, a motor 100 such as a servo motor and a machine 200 are mass points having a mass of $J_m$ and $J_L$, respectively. Friction is ignored. The motor 100 and machine 200 are connected to each other by a spring 30 having a spring constant (stiffness coefficient of the elastically deformable part) K and a damper 40 having a damping constant C. In the figure, u denotes torque, $V_m$ the motor speed, $V_L$ the machine speed, T a combined force of the spring and the damper.

The equations of motion of the motor 100 and machine 200, $V_m$ and $V_L$, and the combined force T of the spring 30 and damper 40 are given as the following equations.

$$V_m = \frac{1}{J_m s}(u - T)$$

$$V_L = \frac{1}{J_L s} T$$

$$T = \left(\frac{K}{s} + C\right)(V_m - V_L)$$

Figure 2:
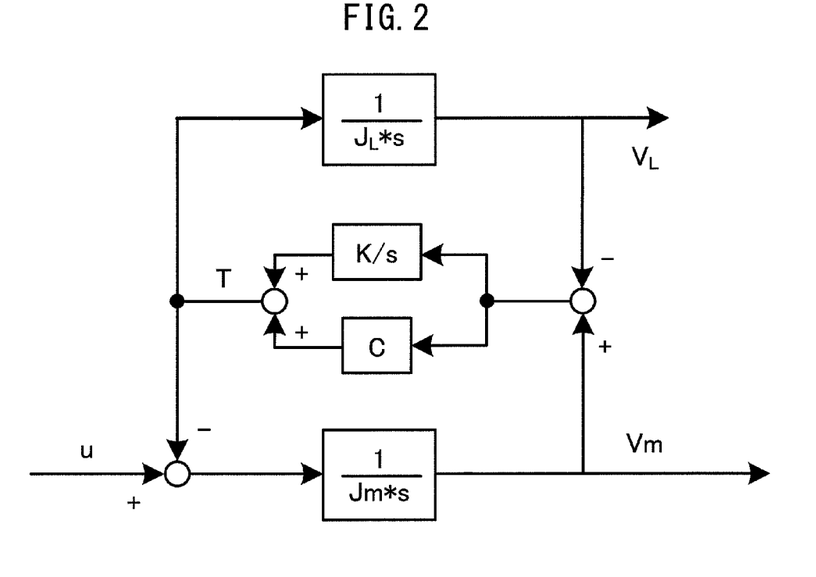
FIG. 2 is a block diagram showing the two-inertia system handled in a motor control apparatus according to the first embodiment of the invention.

The above three equations are illustrated as in a block diagram in FIG. 2.

On the basis of the above equations of motion and the equation of the combined force of the spring and damper, the transfer functions from torque u to motor speed $V_m$ and to machine speed $V_L$ can be determined as the following (Eq. 1) and (Eq. 2), respectively:

Torque → Motor Speed:

$$\frac{V_m}{u} = \frac{1}{s} \cdot \frac{J_L s^2 + Cs + K}{J_m J_L s^2 + (J_m + J_L)Cs + (J_m + J_L)K} \quad \text{(Eq. 1)}$$

Torque → Machine Speed:

$$\frac{V_L}{u} = \frac{1}{s} \cdot \frac{Cs + K}{J_m J_L s^2 + (J_m + J_L)Cs + (J_m + J_L)K} \quad \text{(Eq. 2)}$$

In recent motor control apparatuses, thanks to the control gain becoming higher and use of feed-forward control, the actual position of the motor is promptly controlled as soon as a move command is given to the motor. In other words, the transfer characteristics from the position command of the motor to the actual position of the motor is almost 1.

Figure 3:
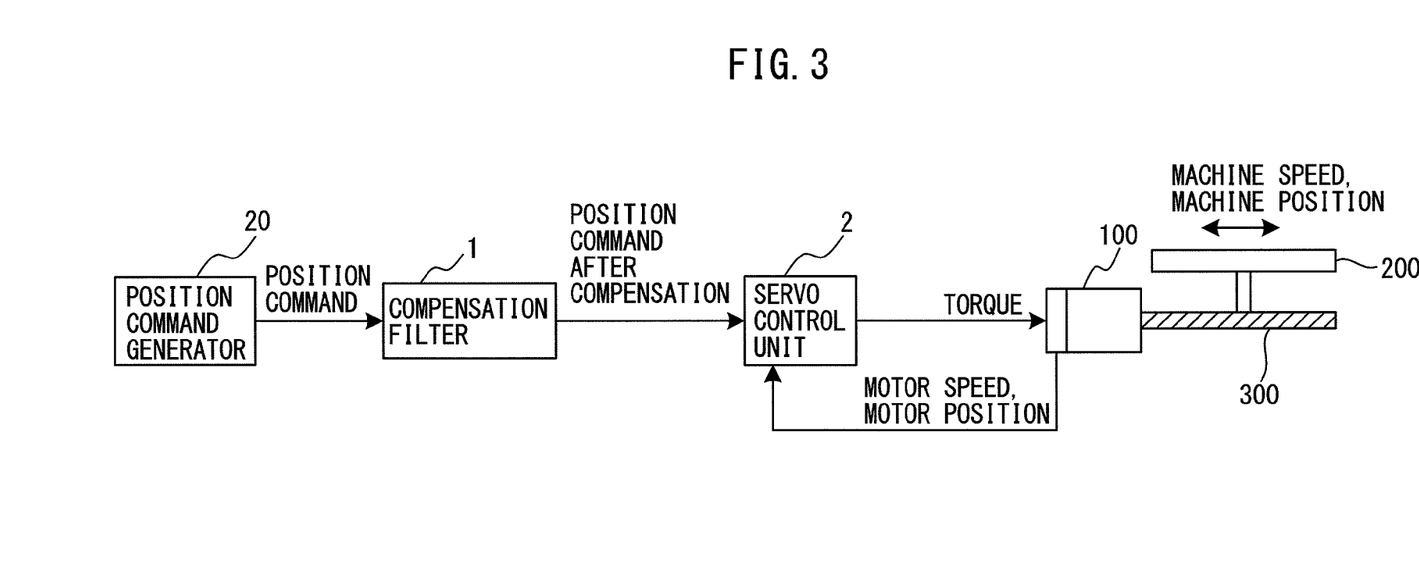
FIG. 3 is a schematic configurational diagram of a motor control apparatus according to the first embodiment of the invention.
Figure 4:
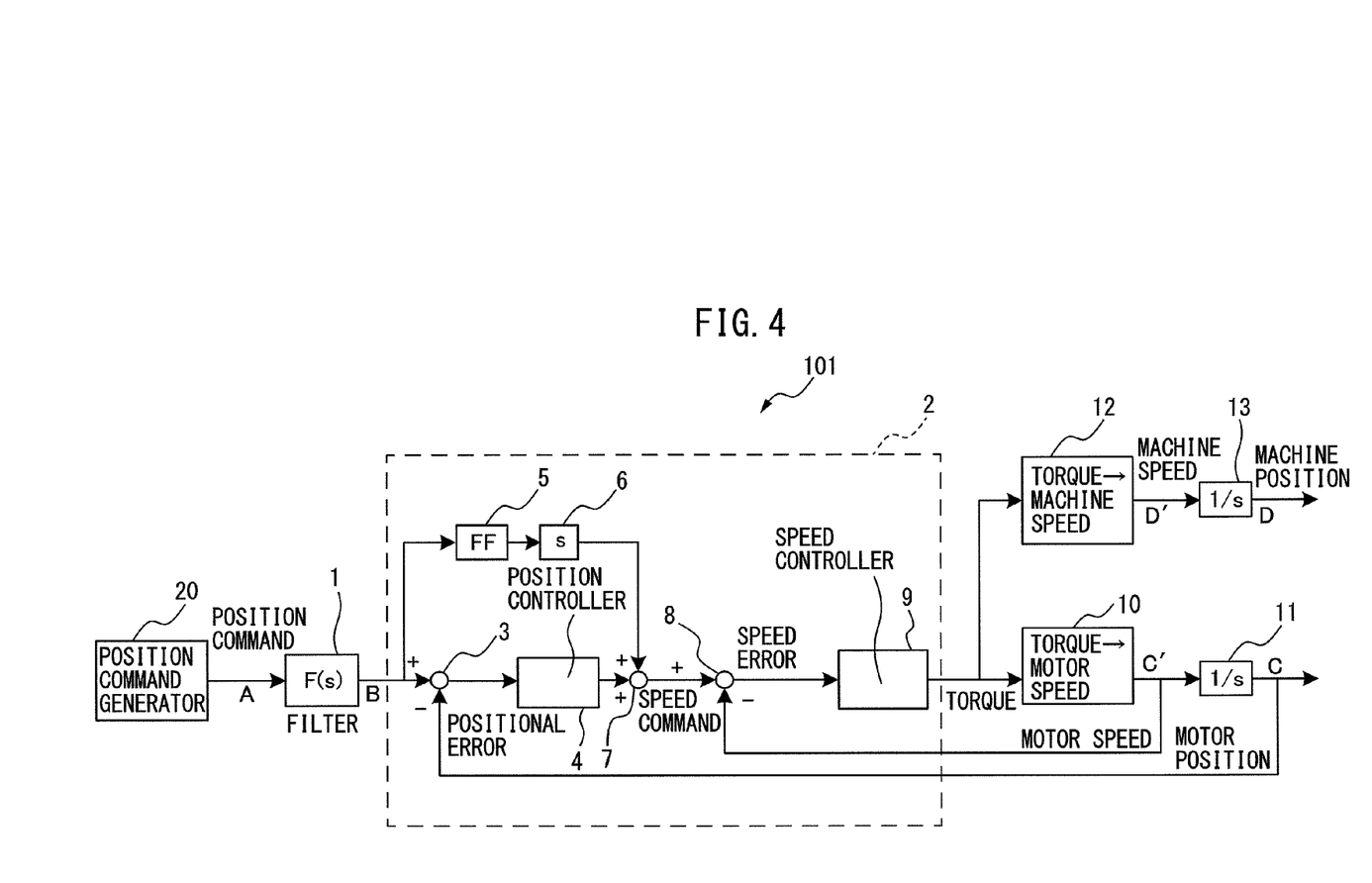
FIG. 4 is a block diagram of a motor control apparatus according to the first embodiment of the invention.

FIG. 3 shows a scheme of the configuration of the motor control apparatus according to the first embodiment of the present invention. FIG. 4 shows its block diagram. A motor control apparatus 101 for controlling a servo motor according to the first embodiment of the present invention includes:

a position command generator 20 for generating a position command of the motor; a compensation filter 1 for compensating the position command generated by the position command generator; and a servo control unit 2 for controlling the movement of the motor based on a position command after compensation, i.e., the position command compensated by the compensation filter 1, and is characterized in that the compensation filter 1 includes a filter F(s) having an inertia $J_L$ of a driven part, a stiffness coefficient K of an elastically deformable part and a damping coefficient C of the elastically deformable part as the elements of filter coefficients.

The operation of the motor control apparatus according to the first embodiment of the present invention will be described. The position command generated by position command generator 20 is input to the compensation filter 1. The compensation filter 1 outputs a position command after compensation as a compensated position command. The servo control unit 2, based on the position command after compensation, outputs torque to control the movement of the motor 100. The movement of the motor 100 causes a transfer mechanism 300 to move the machine 200.

In the servo control unit 2, the position command after compensation is input to a first subtractor 3, which subtracts the feedback of the detected value of the motor position from the input to output a position error, which is, in turn, input to a position controller 4. The position command after compensation is also input to a feed forward unit 5, then is differentiated by a differentiator 6 to output the speed. The output speed is supplied together with the output from position controller 4 to an adder 7, from which a speed command is output.

The speed command is input to a second subtractor 8, which subtracts the feedback of the detected value of the motor speed from the input to output a speed error. The output speed error is supplied to a speed controller 9, which outputs torque. The torque is input to the motor. The motor dynamics is represented as transfer characteristic from torque to motor speed 10, and thus yields motor speed. The generated motor speed is kinematically integrated by a first integrator 11 to give a motor position. On the other hand, in the present invention, transfer characteristic 12 from torque to machine speed is taken into account. Torque is processed through transfer characteristic 12 from torque to machine speed, so that a machine speed is output. Machine speed is kinematically integrated by a second integrator 13 to give a machine position.

The transfer characteristic from the position command of the motor to the actual position of the motor becoming close to 1, is equivalent to the transfer function from the point B to the point C in FIG. 4 becoming close to 1.

In the motor control apparatus according to the first embodiment of the present invention, differing from notch filters or input shaping, as stated above a vibration suppression filter taking path precision into account is provided. To be more specific, the position command given to the servo control system is not a position command to the motor but is regarded as a position command to the machine. This means that the motor is allowed to vibrate as long as the machine is not vibrated, which is markedly different from the conventional concept of notch filters or input shaping that "the components of energy corresponding to the resonance frequencies are removed".

The position command given to the servo control system is regarded as the position command to the machine. Accordingly, it is necessary to perform control such that the transfer characteristic from points A to D will approach to 1.

Herein, when the transfer characteristic from points B to C is assumed to be 1, it is understood that the transfer characteristic from points A to B needs to have an inverse characteristic to that from points C to D.

As can be seen in FIG. 4, the reverse characteristic of the transfer characteristic from points C to D, i.e., the transfer characteristic from points D to C equivalent to the transfer characteristic from points D' to C'. This transfer characteristic can be obtained by dividing the above Eq. 1 by Eq. 2 as follows:—

$$F(s) = \frac{V_m}{V_L} = \frac{J_L s^2 + Cs + K}{Cs + K}$$

Figure 5A:
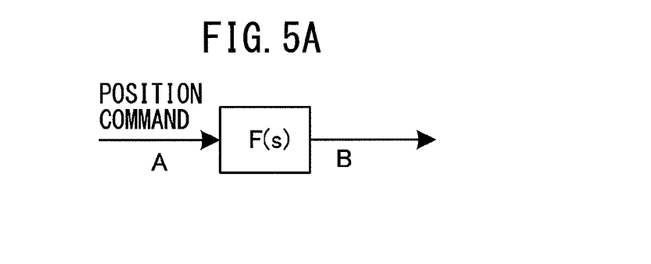
FIG. 5A is a block diagram of a compensation filter of a motor control apparatus according to the first embodiment of the invention.
Figure 5B:
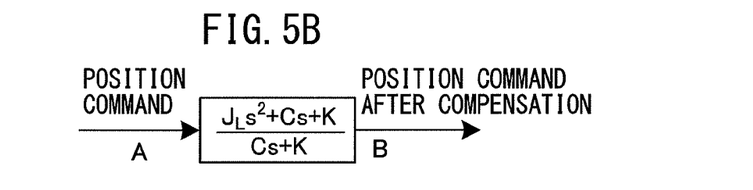
FIG. 5B is a block diagram of a compensation filter of a motor control apparatus according to the first embodiment of the invention.

In the motor control apparatus according to the first embodiment of the present invention, attention is focused on the fact that this filter is dependent on the mechanical system constants ($J_L$, C, K) only, hence the filter can be defined by these three constants. That is, the compensation filter 1 is characterized by inclusion of a filter F(s) having an inertia $J_L$ of a driven part, a stiffness coefficient K of an elastically deformable part and a damping coefficient C of the elastically deformable part as the elements of filter coefficients. FIGS. 5A and 5B show block diagrams of the filter F(s). FIG. 5B shows the F(s) in FIG. 5A represented with mechanical constants ($J_L$, C, K).

As described, according to the motor control apparatus according to the first embodiment of the present invention, it is possible to provide a vibration suppressing filter that is designed by taking path precision into consideration, differing from notch filters or input shaping.

Second Embodiment

Next, a motor control apparatus according to the second embodiment of the present invention will be described. In view of ease of implementation of software, there are cases where calculating a compensation amount to be added to the position command is easier than directly performing a filtering process to the position command. To achieve this, the filtering characteristic determined in the first embodiment should be transformed into a compensation amount.

Figure 6A:
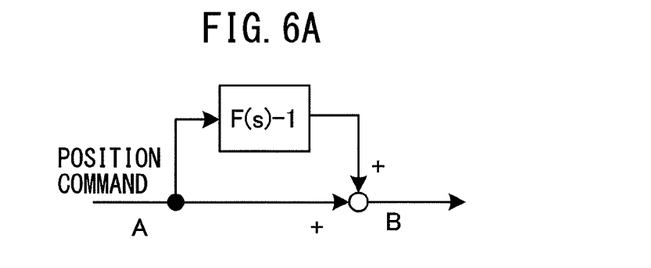
FIG. 6A is a block diagram of a compensation filter of a motor control apparatus according to a second embodiment of the invention.
Figure 6B:
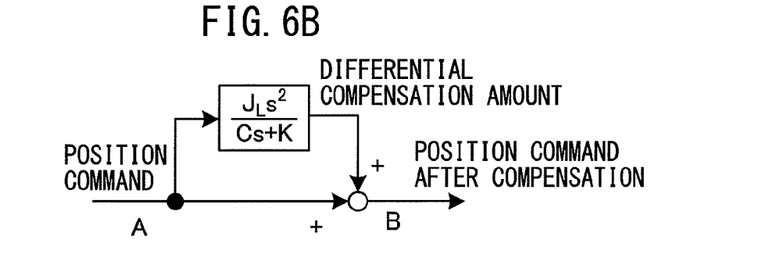
FIG. 6B is a block diagram of a compensation filter of a motor control apparatus according to the second embodiment of the invention.

Formation of a compensation amount to the position command can be done by subtracting 1 from the filter characteristic. The block diagram of the compensation filter of the motor control apparatus according to the first embodiment of the present invention is illustrated in FIG. 5. With this, the block diagram of the compensation filter for the motor control apparatus according to the second embodiment of the present invention can be represented as in FIGS. 6A and 6B. FIG. 6B expresses the F(s)−1 in FIG. 6A by use of the constants ($J_L$, C, K) of the mechanical system. By simple calculation, it is understood that the transfer function can be given by the following equation.

$$F(s) - 1 = \frac{J_L s^2}{Cs + K}$$

In this way, the position command after compensation can be determined by adding a differential compensation amount for implementation of a filter F(s)−1 on the position command, to the position command.

On the basis of the above equation, this equation can be written as follows:—

$$F(s) - 1 = \frac{J_L s^2}{K} \frac{1}{(C/K)s + 1}$$

Therefore, as another way of implementing the filter F(s) included in the compensation filter 1, the following method can be considered, which includes the steps of:

determining an acceleration command (a value obtained by differentiating the position command twice because $s^2$ (the square of Laplace operator or differential operator) is attached;

multiplying the acceleration command by a gain $J_L/K$, determined by the mechanical inertia $J_L$ and the spring constant K of the elastic part; and implementing a first order low-pass filter with a time constant of $\tau = C/K$, determined by the damping constant C and the spring constant K.

Figure 7:
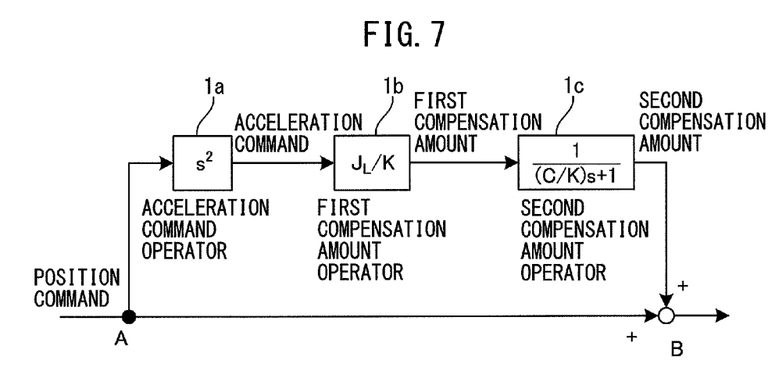
FIG. 7 is a detailed block diagram of a compensation filter of a motor control apparatus according to the second embodiment of the invention; and, FIG. 8 is a detailed block diagram of a compensation filter of a motor control apparatus according to a third embodiment of the invention.

FIG. 7 shows a detailed block diagram of a filter of the motor control apparatus according to the second embodiment. Herein, the part for outputting an acceleration command is given as an acceleration command operator 1a. The part for multiplying a gain $J_L/K$, determined by the inertia $J_L$ of the driven part and the stiffness coefficient K of the elastically deformable part is given as a first compensation amount operator 1b. The part for implementing a first order low-pass filter with a time constant of C/K, determined by the damping constant C of the elastically deformable part and the stiffness constant K of the elastically deformable part is given as a second compensation amount operator 1c. With this configuration, it is understood that the filter F(s) included in the compensation filter 1 can be realized by adding the second compensation amount output from the second compensation amount operator 1c to the position command.

In the motor control apparatus according to the second embodiment of the present invention, the compensation filter 1 includes: an acceleration command operator 1a for calculating an acceleration command, from a position command; a first compensation amount operator 1b for multiplying the acceleration command output from the acceleration command operator 1a, by a gain $J_L/K$, determined by the inertia $J_L$ of the driven part and the stiffness constant K of the elastically deformable part; and a second compensation amount operator 1c for implementing a first order low-pass filter with a time constant of C/K, determined by the damping constant C of the elastically deformable part and the stiffness constant K of the elastically deformable part, on the first compensation amount output from the first compensation amount operator 1b, and is characterized in that the filter F(s) is realized by adding the second compensation amount output from the second compensation amount operator 1c, to the position command.

According to the motor control apparatus of the second embodiment of the present invention, it is possible to suppress vibration that takes the damping coefficient into account and hence is more realistic. As a result, it is possible to expect a high vibration suppressing effect compared to the conventional art.

Third Embodiment

Next, a motor control apparatus according to the third embodiment of the present invention will be described.

The constants $J_L$, C and K that appear in the calculation formula F(s)−1, are all the elements that form the numerator polynomial of the following transfer function from torque to motor speed.

$$\frac{V_m}{u} = \frac{1}{s} \cdot \frac{J_L s^2 + Cs + K}{J_m J_L s^2 + (J_m + J_L)Cs + (J_m + J_L)K}$$

As often used in vibrating systems, the numerator polynomial of the transfer function from torque to motor speed is written in a quadratic standard form.

$$J_L s^2 + Cs + K = J_L\left(s^2 + \frac{C}{J_L}s + \frac{K}{J_L}\right) = J_L(s^2 + 2\zeta\omega s + \omega^2)$$

As a result, the gain and time constant can be determined as follows:—

Gain: $J_L/K = 1/\omega)^2$

Time Constant: $C/K = 2\zeta/\omega$

Since input of the two constants, the frequency ω and the damping factor ζ given in the quadratic standard form, is easier than input of the three constants, the mechanical inertia $J_L$, damping constant C and spring constant K, in the motor control apparatus according to the third embodiment the filter F(s) included in the compensation filter is realized based on the frequency ω and the damping factor ζ.

Figure 8:
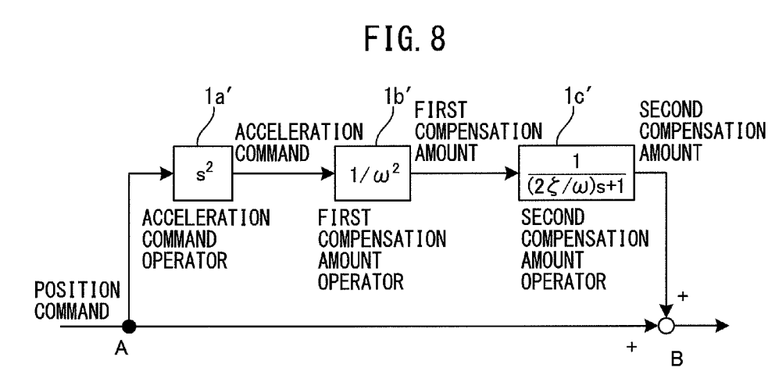

FIG. 8 shows a detailed block diagram of a filter of the motor control apparatus according to the third embodiment. Herein, the part for outputting an acceleration command is given as an acceleration command operator 1a'. The part for dividing by the square of ω is given as a first compensation amount operator 1b'. The part for implementing a first order low-pass filter with a time constant of 2ζ/ω, determined by the vibration attenuation coefficient ζ and the frequency ω is given as a second compensation amount operator 1c'. As a result, it is understood that the filter F(s) included in the compensation filter 1 can be realized by adding the second compensation amount output from the second compensation amount operator 1c' to the position command.

As described, the motor control apparatus according to the third embodiment of the present invention, is characterized in that, instead of inputting the gain $J_L/K$, determined by the inertia $J_L$ of the driven part and the stiffness constant K of the elastically deformable part and the time constant of C/K, determined by the damping constant C of the elastically deformable part and the stiffness constant K of the elastically deformable part, the frequency ω and the vibration attenuation coefficient ζ are input to realize the filter F(s) included in the compensation filter.

As described heretofore, according to the motor control apparatus of the embodiments of the present invention, it is possible to compensate the two-inertia system, which is the simplest vibration model, on the basis of path control.

The invention claimed is:

1. A motor control apparatus for controlling a servo motor, comprising:

a position command generator configured to generate a position command of the motor;

a compensation filter configured to compensate the position command generated by the position command generator; and, a servo control unit configured to control the movement of the motor based on a position command after compensation which is the compensated position command by the compensation filter, wherein the compensation filter includes a filter F(s) having an inertia Jr of a driven part, a stiffness coefficient K of an elastically deformable part and a damping coefficient C of the elastically deformable part as the elements of filter coefficients, wherein the filter F(s) included in the compensation filter is represented by $F(s) = (J_L \times s^2 + C \times s + K)/(C \times s + K)$ wherein the position command after compensation is determined by adding a differential compensation amount for implementation of a filter, $F(s) - 1 = (J_L \times s^2)/(C \times s + K)$, on the position command, to the position command, wherein the compensation filter includes:

an acceleration command operator configured to calculate an acceleration command from the position command;

a first compensation amount operator configured to multiply the acceleration command output from the acceleration command operator by a gain $J_L/K$, determined by the inertia $J_L$ of the driven part and the stiffness constant K of an elastically deformable part; and, a second compensation amount operator configured to implement a first order low-pass filter with a time constant of C/K, determined by the damping constant C of the elastically deformable part and the stiffness constant K of the elastically deformable part, on a first compensation amount output from the first compensation amount operator, wherein the filter F(s) is realized by adding a second compensation amount output from the second compensation amount operator, to the position command, wherein the gain $J_L/K$ is determined by the inertia $J_L$ of the driven part and the stiffness constant K of the elastically deformable part, wherein the time constant C/K is determined by the damping constant C of the elastically deformable part and the stiffness constant K of the elastically deformable part, and wherein the gain $J_L/K$ and the time constant C/K are input to realize the filter F(s) after being determined by the following equations using the frequency ω and the vibration attenuation coefficient ξ

$J_L/K = 1/\omega_2$ $C/K <= 2\xi/\omega$.

\* \* \* \* \*